Oct. 21, 1941.  F. H. WALKER ET AL  2,260,067
ELECTRICAL MOTOR DRIVEN WINDOW APPARATUS
Filed July 19, 1940  4 Sheets-Sheet 1
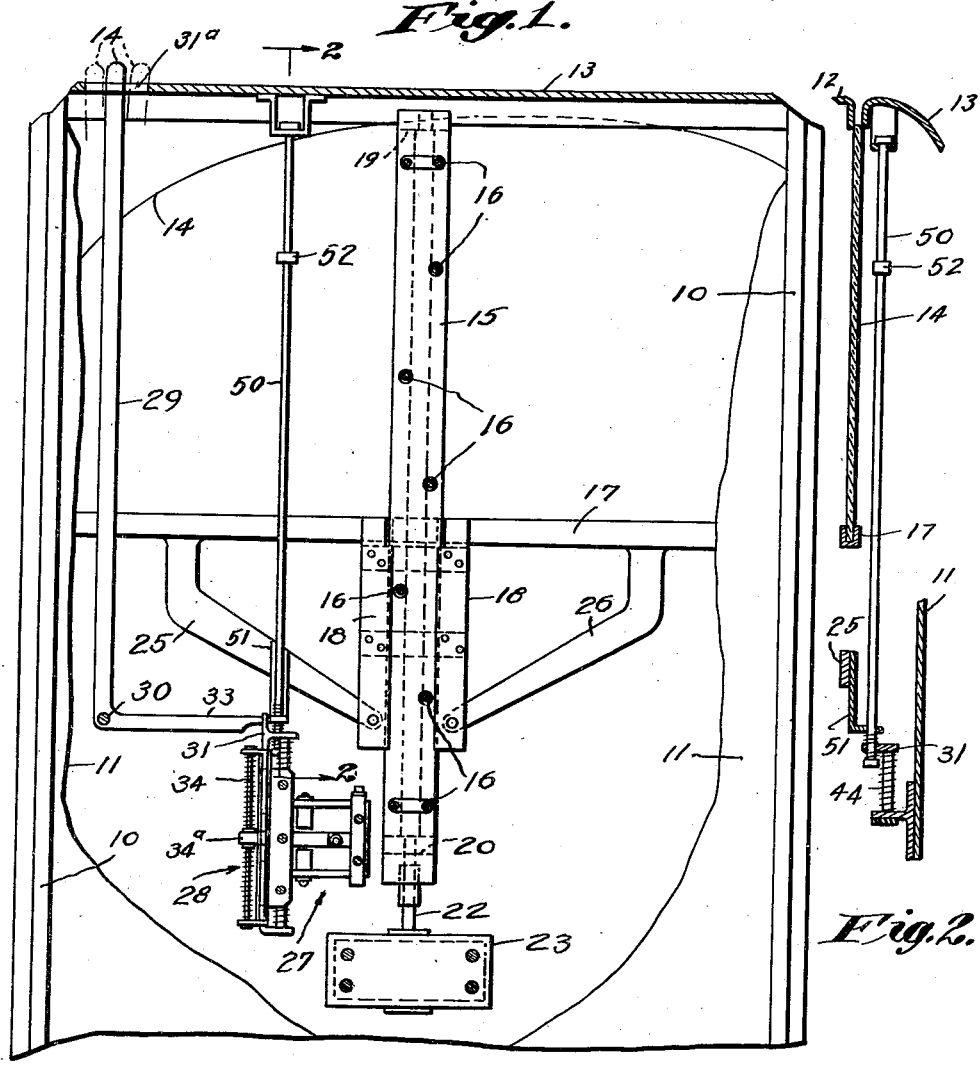
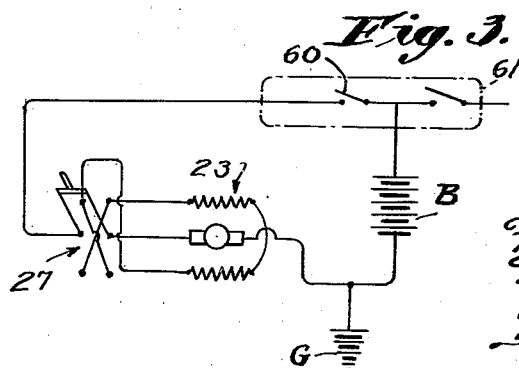
Inventors
Frank H. Walker
Daniel L. Chandler
By James C. Hamilton
Attorney

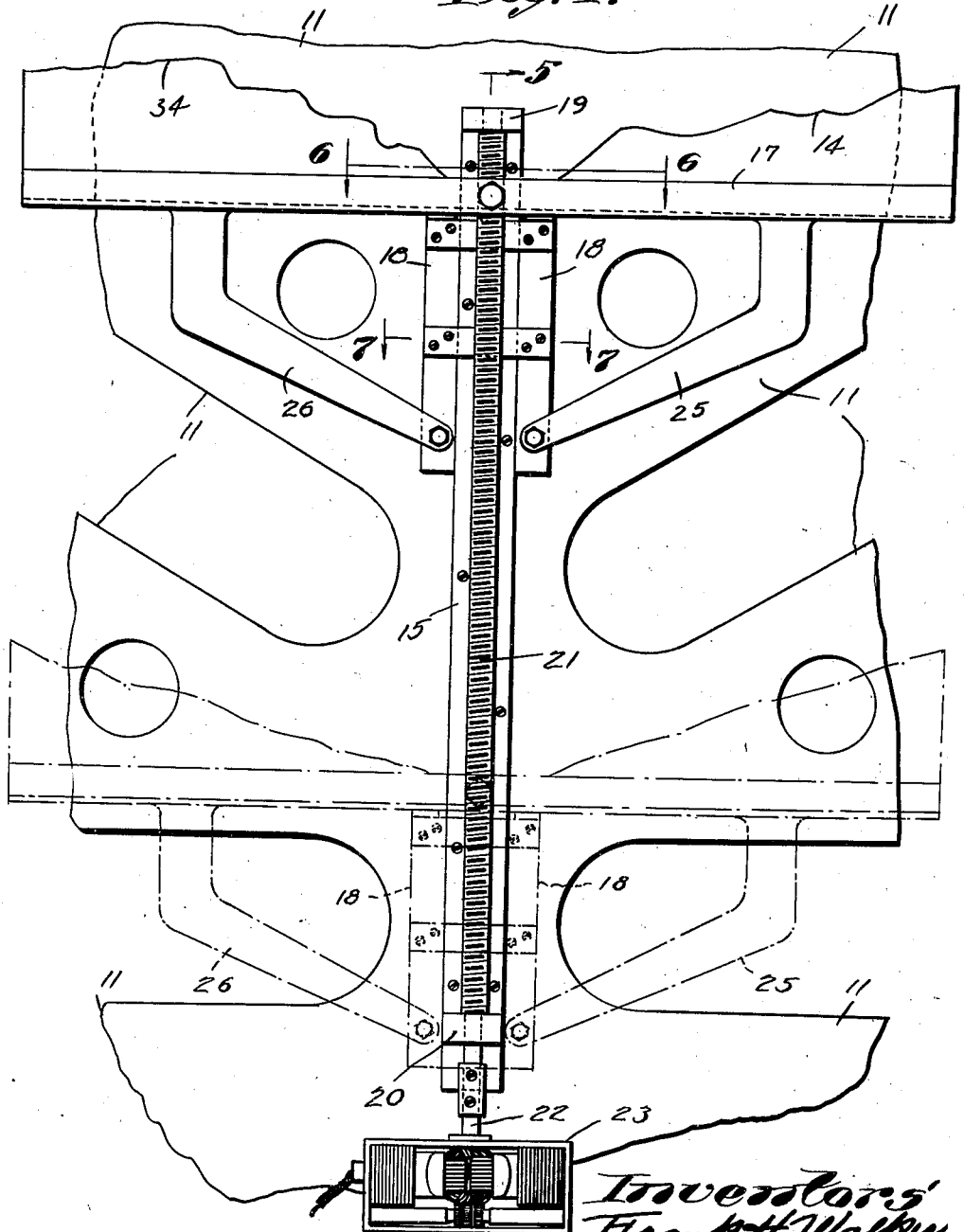

Oct. 21, 1941.   F. H. WALKER ET AL   2,260,067
ELECTRICAL MOTOR DRIVEN WINDOW APPARATUS
Filed July 19, 1940   4 Sheets-Sheet 3
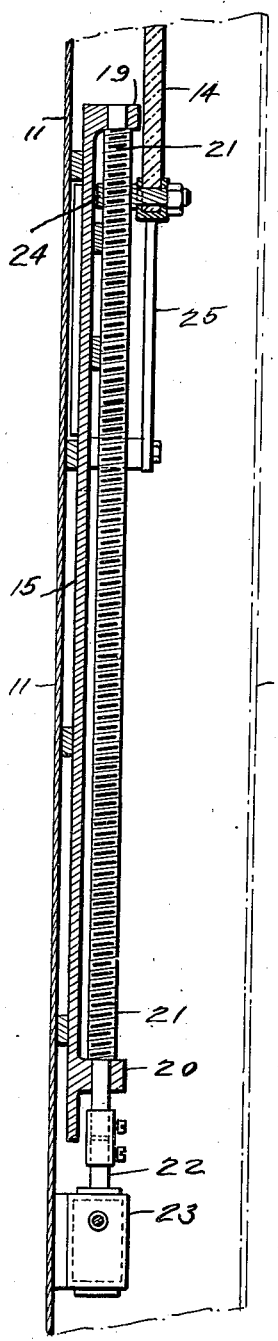
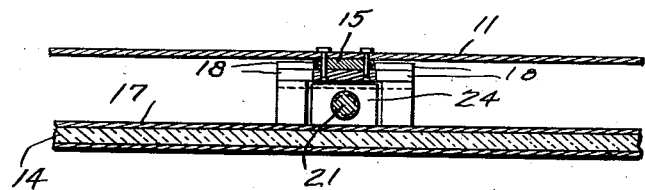
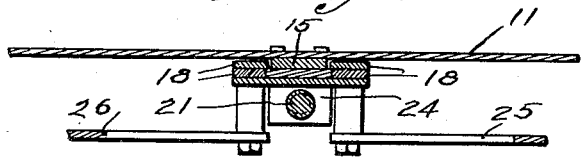
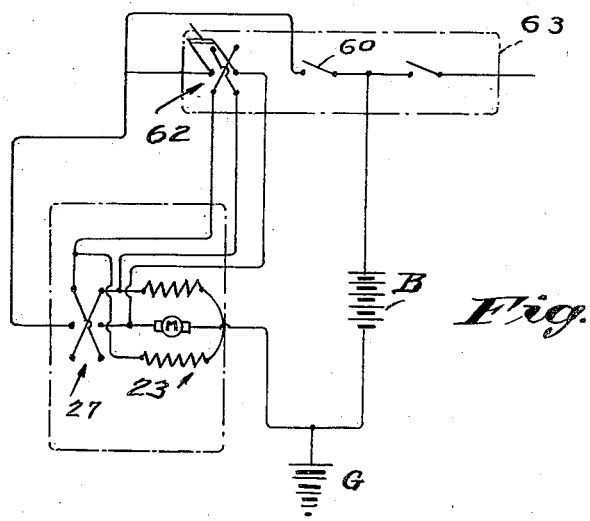

Oct. 21, 1941.　　F. H. WALKER ET AL　　2,260,067
ELECTRICAL MOTOR DRIVEN WINDOW APPARATUS
Filed July 19, 1940　　4 Sheets-Sheet 4
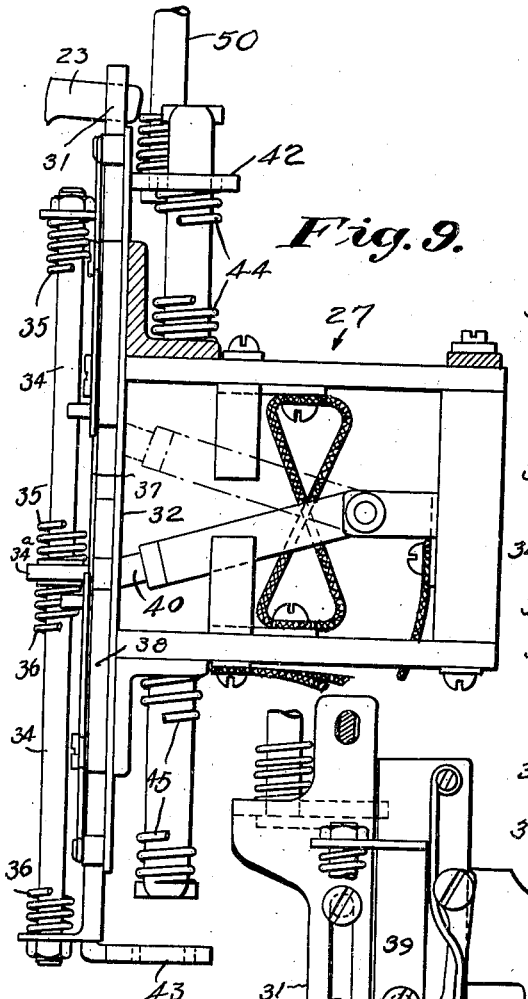
Inventors
Frank H. Walker.
Daniel L. Chandler.
By James C. Hamilton
Attorney

UNITED STATES PATENT OFFICE 2,260,067

ELECTRICAL MOTOR DRIVEN WINDOW APPARATUS

Frank H. Walker and Daniel L. Chandler, Salem, Mass., assignors to Aresee Company Inc., Salem, Mass., a corporation of Massachusetts Application July 19, 1940, Serial No. 346,307

3 Claims. (Cl. 268—124)

Our present invention relates to electrical motor driven window apparatus whereby the window pane is raised and lowered by means of electricity, automatically controlled either on the window or, for instance, the dash panel of an automobile.

In automotive vehicles it has long been the practice to provide hand operated mechanisms, such as a crank, lever or the like for the purpose of raising and lowering the window pane. In all such devices it is necessary to exert a continuous sustained movement in order to effect the desired result.

It is apparent that in the operation of a motor vehicle, such as an automobile, under modern conditions, all of the operator's attention should be applied to the direct operation of the automobile without distractions arising from less important factors.

Present-day automobiles travel relatively fast, as compared to similar vehicles of the past decade which make it almost imperative that the operator's attention be not diverted for any length of time from the road and the various turns and intersections with which he must be concerned. These facts are being evidenced from day to day by the development of time-saving devices applied to such vehicles.

In all time-saving devices the element of automatic operation is quite important. In other words, it is not enough to be able to turn cranks, push and pull levers, or make other movements by the operator's hands, for all such irregular movements distract the operator's attention and disrupt his coordination with other more or less automatic movements which he is accustomed to in the normal operation of the automobile.

In our present invention, we have designed and developed a new automatic mechanism for controlling automobile window panes and the like which not only make it convenient for the automobile operator to actuate such members but which makes it unnecessary for him to divert his attention from the usual road hazards to which he is continually exposed in the normal operation of his vehicle.

Our improved electrical automatic mechanism is designed to facilitate the operation of the automobile windows. In other words, the operator is only required to make one movement either on the dash of the vehicle or at the door in order to raise the window up or down as the case may be. The release of pressure of the operator's finger terminates the travel of the window pane either up or down, and furthermore, until such operation is continued, the window cannot be moved. At the same time the operator does not have to watch the window in order to know just when to stop it as the automatic mechanism provided will automatically relieve him from this observation.

Our principal object in the present application is an improved automotive vehicle window operating apparatus;

Another object is an improved window operating apparatus operated by means of an electrical reversible motor;

Still another object is an electrically operated automotive window incorporating a direct driving apparatus in combination with automatic electrical control mechanism which controls the up and down movement of said window;

Still another object is an improved automobile window operating mechanism in combination with a double throw double pole switch which is directly connected with a reversible electrical motor directly connected with the window pane of the vehicle;

And still another object is an electrical drive mechanism directly connected with the window pane of the vehicle in which a central lift screw is used, the said screw being braced from opposite sides, and Other objects and novel features comprising the construction and operation of our invention will appear as the description of the same progresses.

In the drawings illustrating the preferred embodiment of our invention:

Fig. 1 is a partial inside elevation of an automobile door, the inner panel being broken away to show the inner attached mechanisms as well as the upper and lower portions of the door. Certain other parts, as the electrical switch are shown in more or less diagrammatic form for the sake of simplicity;

Fig. 2 is a cross-section taken on the line 2—2 of Fig. 1, portions being broken away or eliminated for the sake of simplicity;

Fig. 3 is wiring diagram of the electrical apparatus, as used in the automobile door and manipulated from the door;

Fig. 4 is an enlarged side elevation, as viewed from the outside automobile panel side of the vehicle, portions of the panel and other parts being broken away for the sake of convenience;

Fig. 5 is a vertical cross-section taken on the line 5—5 of Fig. 4, dot-and-dash lines indicating the inside door panel;

Fig. 6 is a plan cross-section taken on the line 6—6 of Fig. 4, slightly enlarged, and showing the control screw which lifts and lowers the window pane apparatus;

Fig. 7 is a plan cross-section taken below Fig. 6 and showing the slide-way and slide-way guides together with the side braces;

Fig. 8 is an enlarged side elevation of the automatic electrical switch in combination with the double pole double throw switch which controlled the electrical reversible motor directly connecting with the window-pane, portions of which are shown in cross-section and other portions of which are broken away for convenience.

Fig. 9 is a view of the automatic electrical switch and connected automatic mechanism, similar to that shown in Fig. 8 but showing the mechanism in reversible positions. The full lines showing one position of the apparatus when the electrical motor is energized in one direction and before the automatic apparatus has been returned to a neutral position, the dot-and-dash lines indicate the reverse position of the electrical knife switch when the direction of the electrical motor is reversed;

Fig. 10 illustrates the left-hand side of the automatic mechanism of the switch when it is in the position shown in Fig. 9. In this position the electrical knife switch has been contacted, as shown in Fig. 9 but the automatic mechanism has not returned to rest, as in Fig. 8, and Fig. 11 shows a detail, other parts being cut away, and showing the position of certain parts just before the electrical knife switch operates, and Fig. 12 is a wiring diagram showing the method of wiring used when it is desired to control and operate the door from the dash of a motor vehicle instead of from the operating lever in the door.

Referring more in detail to the drawings illustrating our invention, 10 indicates the frame of an automobile door. On the inner side of the door 10 is located the conventional metal panel 11 which usually extends from the window sill portions 12 and 13 to a point more or less near the bottom of the door. The window pane 14 operates between the window sill portions 12 and 13, as shown in Fig. 2.

In our present apparatus, we have eliminated the conventional geared mechanism which raises and lowers the window pane 14 and substituted a motor driven apparatus, as will be described. All window control apparatus is directly mounted on the panel member 11.

In the central portion of the panel 11 we have mounted a vertical guide member 15 which is spaced away from the panel member 11 by means of spacers 16. On the lower edge of the window pane 14 is a channel member 17. To this channel member 17 we have attached guide members 18. The guide members adjacent the panel member 11 extend over the edges of the guide member 15 and together with the said guide member 15 form a slide and slide ways.

At the top and bottom of the guide member 15 are located right angled brackets 19 and 20 respectively. Journalled in the brackets 19 and 20 is a threaded screw member 21 the lower end of which is directly connected to the rotor shaft 22 of a reversible electrical motor 23 which is also mounted on the panel 11.

Attached to the window pane channel member 17 is a threaded block 24 through which is threaded the screw member 21.

It will thus be seen that when the screw 21 is rotated in either direction the window pane 14 moves up or down, as the case may be.

Fixed to the window pane channel 17 are brace member 25 and 26, the other ends of said braces being fixed to the lower ends of the guide members 18. The purpose of the braces 25 and 26 is to prevent the window pane and attached channel member 17 from tilting either to the right or left which would cause the threaded block 24 to become bound or cramped on the screw 21 thereby stalling the motor 23. It will be apparent that the window pane 14 cannot be raised or pushed down without turning the screw member 21 thereby making it impossible for a trespasser to open the window from the outside when it has been left open a small amount for ventilation without operating the electrical control mechanism.

To manually operate the electrical motor 23, we have shown an operating lever mechanism and reversible switch and switch mechanism previously disclosed in our copending application Ser. No. 341,838, filed June 22, 1940.

The control mechanism comprises a double pole double throw switch generally indicated at 27 to which is fixed an automatic switch operating mechanism generally indicated at 28. The automatic switch mechanism 28 is operated manually by means of a lever 29 which is pivoted at 30 to the panel 11. The upper end of the lever 29 protrudes through a slot 31a provided in the sill member 13.

In Figs. 8, 9 and 10 we have reproduced certain views of the combined double pole double throw switch 27 and the switch mechanism 28. Further details of this mechanism is shown in our copending application above referred to. Briefly, the mechanism 28 is provided with an operating slide 31 which is slidably mounted on the base plate 32 to which the switch member 27 is fixed. The operating slide member 31 is directly connected to the lever arm 33 of the operating lever 29 so that when the operating lever 29 is pivoted right or left on the pivot 30 the slide 31 will be pulled up or pushed down from its neutral position shown in Fig. 8. When the slide 31 is pushed down, as shown in Figs. 9 and 10, the spring rod saddle member 34a compresses the equalizing springs 35 and 36, as shown in Fig. 11. Fig. 11 shows the position of these elements just before the lowermost position of the slide 31 is reached. In this position, the cam 37 raises the pawl member 38, also pivoted on the plate 32, and a second slide mounted on plate 32 and indicated at 39 is released and the spring rod 34 which is connected to the slide 39 snaps the slide 39 down quickly to the position shown in Fig. 10.

On the switch member 27 we have provided an extension member 40 which projects up through the base 32 and terminates in a slot 41 located in slide 39. When the slide 39 acts the switch 27 is thrown into the position shown in Fig. 9.

On the back of the slide 31 are brackets 42 and 43 which act against the compression springs 44 and 45. When the pressure is released from the lever 29, the slides 31 and 39 automatically return to their neutral position, as in Fig. 8 and the electrical switch 27 opens the electrical circuit to the motor 23. When the lever 33 is swung upwardly the slide 31 moves up and a reverse action to that just described takes place throwing the switch 27 into reverse and thereby reversing the direction of the motor 23.

In a similar manner, as in our copending application, we have shown a rod 50 slidably engaged through a bracket 51 secured to the brace member 25. If the lever 29 is held over in the direction which raises the window pane 14 until the window pane reaches its uppermost position, the bracket 51 engages the collar 52 raising the rod 50 and the collar on the lower end of the rod 50 pulls the slide 31 back to neutral. In a similar operation, the bracket 51 will push the slide 31 down into a neutral position if the lever 29 is kept over to the left side of the slot 31a when the window pane 14 reaches its lowermost position thereby cutting out the motor 23.

When the door operating lever is used, the electrical circuit shown in Fig. 3 is used and the motor 23 is controlled from the switch 27 by means of the automatic switch mechanism 28. Electrical current is furnished from the battery B and passes through a key switch 60 located on the dash of the automobile, as indicated at 61 in Fig. 3. When this switch is locked the door mechanism cannot be operated.

In Fig. 12 we have disclosed another method of wiring in which the same battery B, ground G and key switch 60 is used. In this hook-up, the switch mechanism 28 is removed and the switch 27 is left in a neutral position and another switch 62 of the same type is placed on the panel 63 and the window pane 14 is operated directly from the panel 63.

Having thus described our invention, what we claim as new is:

1. The combination with a vertically sliding window, of a window operating mechanism comprising a channel member on which the window is mounted in a window frame, a threaded shaft threaded through a projection member attached to said window channel, a reversible electrical motor located within the confines of said window being directly connected to said shaft, a double throw double pole electrical switch also mounted within the confines of said window and provided with a spring actuated operating lever, a bellcrank lever pivoted in said window frame, one end of said bellcrank lever having a pivot portion pivoted in said window frame, and a switch contacting end portion engaged with said operating lever extending above sill of said window, the free end of said bellcrank lever providing a finger control portion for operating said bellcrank lever, a vertical rod slidably engaged at its upper end with the under side of said sill, the lower end being slidably engaged through a projection located on said switch operating lever, a bracket member indirectly fixed to said window channel member and slidably engaged around said vertical rod, an upper stop member located on said rod for the purpose of engaging with said bracket member when said window is raised to its uppermost position, a lower stop member attached to the bottom end of said rod engaging with the lower side of the said projection on said operating switch lever when said window is raised to its uppermost position for the purpose of raising said operating switch lever and neutralizing said switch, the said window channel bracket member engaging the upper side of said operating switch lever projection when the said window is moved into its lowermost position and moving said operating switch lever into a neutral position from an opposite direction, the lower end of said bellcrank lever engaged through a slot located in said operating lever for the purpose of moving said operating switch lever up or down to close said switch and energize said motor.

2. In an electrically operated and controlled automobile door window, the motive force and raising and lowering apparatus comprising a vertical screw member mounted in said door having an engaging nut attached to said window and located between the door window and the threaded portion of said screw, and a directly connected electrical reversible motor connecting with said screw, a motor control apparatus located in said door comprising a spring operated double throw double pole switch electrically connected with said motor, said switch having a sliding switch operating lever, a switch control hand operating lever pivoted in said door, one end of said hand operating lever engaging with said sliding switch operating lever and the other end providing a finger member projecting through the sill of said window, a bracket member attached to said window and engaged around a vertical slidable rod member mounted in said door, one end of said rod being slidably engaged through said switch operating lever and the other end being attached to the sill of said window, stop members located on said rod above said window bracket member and below said switch operating lever, the upper rod stop member engaging with said window bracket member for the purpose of neutralizing said switch when the window is operated to its limit in one direction, and the lower rod stop member engaging with said sliding operating switch member for the purpose of neutralizing said switch when the window is operated in a reverse direction, said hand operating lever engaging said sliding switch lever for the purpose of energizing said switch in either direction.

3. In an electrically operated automobile door window and the like, the said window being provided with vertical screw elevating member and a directly connected electrical reversible motor, a motor control apparatus comprising a bellcrank lever pivoted in said door and having one end protruding above the sill of said window, the other end of said lever engaging with a sliding spring actuated operating lever of an electrical double pole double throw switch for the purpose of closing said switch with said motor, the said switch being electrically connected with said motor, a bracket member engaged around a vertically slidable rod mounted in said door, one end of said rod engaged through said electrical switch operating lever and having a stop member located on the said end engageable with said sliding spring actuated operating lever, the opposite end of said rod being slidably mounted in said door and having a stop member located above said bracket for the purpose of engaging said bracket when said window is raised to a high position, the said lower stop member on said rod engaging with said sliding spring actuated operating lever for the purpose of opening said switch when said window is in the high position, the said window bracket engaging said sliding spring actuated operating lever and opening said switch when the said window is in a lowermost position, the lower end of said bellcrank lever engaging with said sliding spring actuated operating lever for the purpose of sliding said sliding lever up or down and closing said switch.

FRANK H. WALKER.
DANIEL L. CHANDLER.